W. G. JOHNSON.
BRAKE MECHANISM FOR MOTOR CYCLES AND THE LIKE.
APPLICATION FILED MAY 22, 1915.
1,265,786. Patented May 14, 1918.
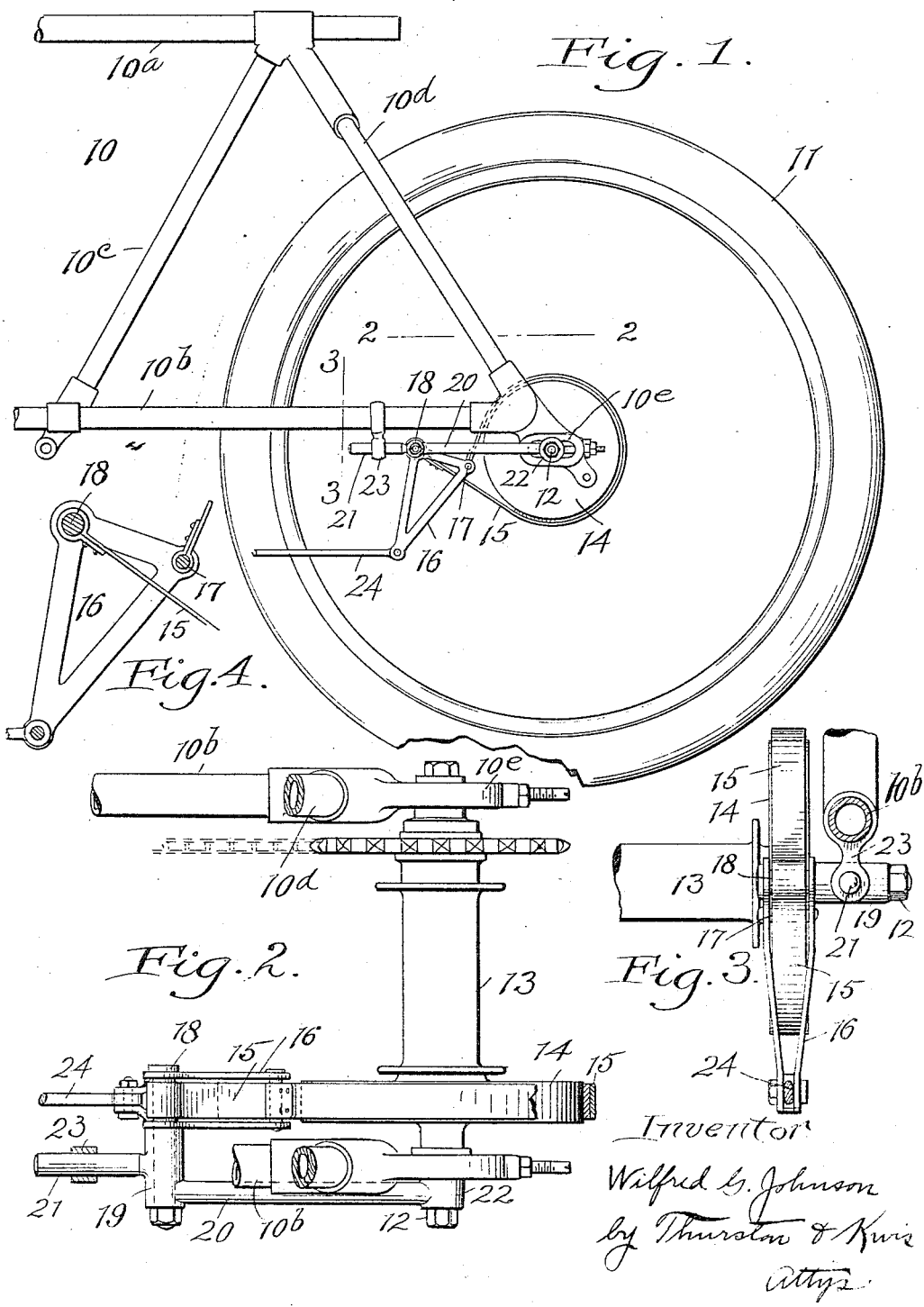

UNITED STATES PATENT OFFICE.

WILFRED G. JOHNSON, OF ELYRIA, OHIO, ASSIGNOR TO W. B. D. ALEXANDER, OF CLEVELAND, OHIO.

BRAKE MECHANISM FOR MOTOR-CYCLES AND THE LIKE.

1,265,786.    Specification of Letters Patent.    Patented May 14, 1918.

Application filed May 22, 1915. Serial No. 29,712.

*To all whom it may concern:*

Be it known that I, WILFRED G. JOHNSON, a citizen of the United States, residing at Elyria, in the county of Lorain and State of Ohio, have invented a certain new and useful Improvement in Brake Mechanism for Motor-Cycles and the like, of which the following is a full, clear, and exact description.

This invention relates to brake mechanism adapted particularly for use on motor cycles and on vehicles of like character.

The chief object of the invention is to provide a simple, efficient and inexpensive brake mechanism, the parts of which are so supported and mounted that the rear wheel of the motor cycle may be shifted to adjust the tension of the driving chain without disturbing the fixed relationship between the parts of the brake and of the rear wheel.

My invention may be briefly summarized as consisting in certain novel details of construction and combinations and arrangements of parts which will be described in the specification and set forth in the appended claims.

In the accompanying sheet of drawings, Figure 1 is a side view of the rear part of a motor cycle frame and rear wheel equipped with my improved brake mechanism; Fig. 2 is a plan view with parts in section showing certain portions of the frame, hub of the rear wheel and the brake, the section being taken substantially along the line 2—2 of Fig. 1; Fig. 3 is a sectional view of the same substantially along the line 3—3 of Fig. 1; and Fig. 4 is a detail view showing particularly one of the brake levers.

The brake mechanism constituting the subject matter of this application is designed particularly for use on motor cycles, and although it may be employed to advantage on somewhat similar vehicles, such as bicycles, for convenience in description, the machine to which the brake is applied will be referred to as a motor cycle.

Referring now to the drawings, 10 represents the frame of the motor cycle or other vehicle, which frame includes an upper horizontal tube 10$^a$, a pair of lower horizontal tubes 10$^b$, downwardly inclined connecting members, such as shown at 10$^c$, and a rear fork 10$^d$ adapted to accommodate the rear wheel 11 which may be mounted at the lower rear part of the frame in the customary manner by means of the bolt or shaft 12 extending through the hub 13 of the wheel and through the slotted portions 10$^e$ of the frame. The wheel hub 13 is provided just inside of one of the lower horizontal tubes 10$^b$ with a brake drum 14 which is adapted to be engaged by a coöperating friction brake band 15 which may be faced with any suitable friction material. The brake is applied to the drum or released therefrom by a two-part brake lever composed of spaced triangular-shaped levers or lever members 16 to which one end of the brake band is connected at 17. These two triangular-shaped members 16 are preferably steel punchings, and are arranged on opposite sides of the brake band 15 so as to steady the same or hold the band in alinement with the brake drum and to prevent lateral movement of the band relative to the drum. The two brake levers or lever members 16 are mounted on a bolt 18 which extends through and is supported in a boss 19 of what may be termed an anchorage member having an arm 20 projecting rearwardly and an arm 21 projecting forwardly from the boss. The arm 20 which is somewhat longer than the arm 21 is provided at its rear end with a boss 22 through which the axle bolt 12 of the rear wheel passes. The forwardly projecting arm 21 passes through the eye of a hanger 23 which is secured to the adjacent tube 10$^b$ of the frame, the member 21 having a sliding connection in said hanger 23. To the lower end of the triangular-shaped lever members 16 there is connected a brake rod 24 which extends forwardly to some point within convenient reach of the operator while riding the motor cycle.

It will be observed that although the anchored end of the brake band, that is, the end which is connected to the bolt 18, is in effect mounted on the frame or on a part which is connected to and normally fixed relative to the frame, nevertheless, as the anchored end of the band is connected direct to the slidable member composed of the integral portions 19, 20 and 21, which moves with the rear wheel when the same is adjusted back and forth relative to the frame, the adjustment of the wheel does not in any way affect the adjustment of the brake band. Additionally, this construction possesses the advantages required for the attainment of the other objects of the invention heretofore named.

While I have shown the preferred embodiment of my invention, nevertheless, I realize that the invention may be embodied in forms other than that specifically described in this case, and illustrated in the drawings, and I, therefore, do not desire to be confined to the exact details shown, but aim in my claims to cover all modifications which do not involve a departure from the spirit and scope of my invention.

Having thus described my invention, what I claim is:—

1. In combination in a vehicle of the class described, a frame, a rear wheel with a supporting stud or shaft serving as an axle for the wheel, the frame having a portion extending forwardly alongside the rear wheel, a brake including a drum rotatable with the wheel and a band surrounding the drum, a rod connected at its rear end to the axle and supported at its front end on said portion of the frame extending alongside of the wheel, a brake lever pivotally supported on the rod at a point between the connections of said rod with the axle and frame, said lever being connected to the band so that when shifted it will tighten or release the latter, and brake operating means connected to said lever.

2. In a vehicle of the class described, a frame, a rear wheel supported by the frame, an axle for the rear wheel, a rod projecting forwardly from the axle and at its forward end being adjustably supported on the frame, a brake including a drum rotatable with the wheel and a band surrounding the drum, and a brake lever connected to said rod at a point between the axle and the point of connection of said rod with the frame, one end of the band being connected with the lever and the other end being stationary and terminating at the axis of oscillation of the lever.

3. In a vehicle of the class described, a frame, a rear wheel, an axle for the wheel, a brake including a drum rotatable with the wheel and a brake band surrounding the same, a brake lever and a supporting rod therefor connected at its rear end to the axle and at its forward end adjustably supported on the frame, said lever being pivotally supported on said rod between the points of connection thereof with the frame and axle, and being substantially triangular in shape one point of the triangle being connected to one end of the band, another point of the triangle being connected to said rod, and means for rocking said lever connected to the third point of the triangle.

In testimony whereof, I hereunto affix my signature in the presence of two witnesses.

WILFRED G. JOHNSON.

Witnesses:
L. I. PORTER,
A. J. HUDSON.

Copies of this patent may be obtained for five cents each, by addressing the "Commissioner of Patents, Washington, D. C."